May 26, 1970     S. E. COLEY     3,514,166

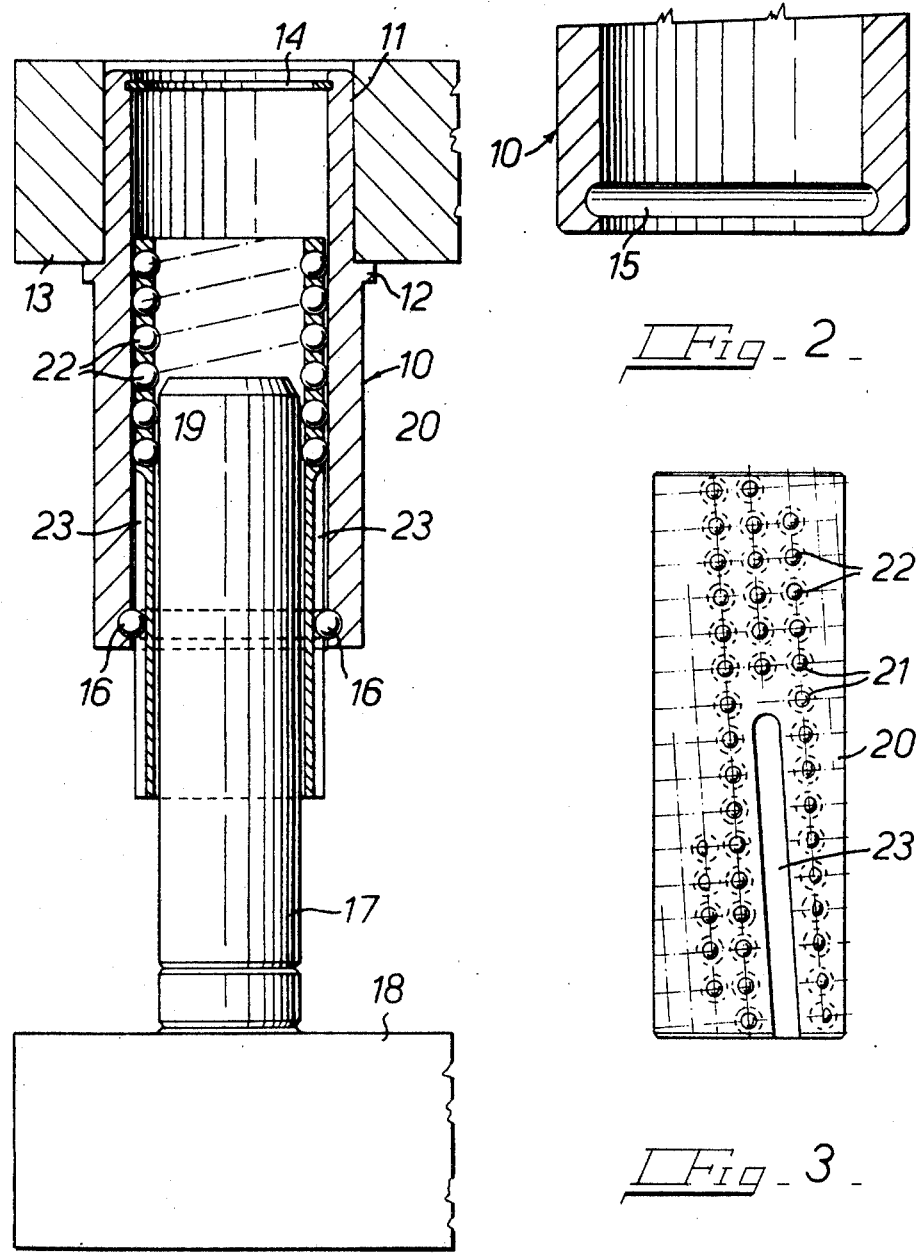

GUIDES FOR DIE SETS

Filed Aug. 8, 1968     2 Sheets-Sheet 2

United States Patent Office 3,514,166
Patented May 26, 1970

3,514,166
GUIDES FOR DIE SETS
Samuel E. Coley, Dorridge, Solihull, England, assignor to Rotolin Bearings Limited, Solihull, Warwickshire, England
Filed Aug. 8, 1968, Ser. No. 751,252
Claims priority, application Great Britain, Aug. 12, 1967, 37,128/67
Int. Cl. F16c 1/26, 17/00, 21/00
U.S. Cl. 308—6          7 Claims

ABSTRACT OF THE DISCLOSURE

A guide for a die set has a bush for attachment to the punch plate, a pin for attachment to the base, and a cage with balls which roll between the bush and pin. The cage has longitudinal grooves entered by projections which are rotatably mounted in the bush so that the cage can rotate when the pin is disengaged. The grooves may be inclined to the axis and parallel with rows of balls in the cage. The projections may be balls running in an annular groove in the bush, or lugs on a ring rotatable in the bush.

This invention relates to guides for die sets, and is concerned with an improved guide of the kind (hereinafter referred to as the kind specified) comprising a bush, secured or adapted to be secured to the punch holder of a die set, a guide pin, secured or adapted to be secured to the base of a die set, and a rectilinear bearing, comprising a plurality of balls mounted in a cage, acting or adapted to act in rolling engagement between the bush and the guide pin.

According to the present invention there is provided a guide of the kind specified in which the cage has longitudinally extending grooves in its outer surface which are entered by inwardly projecting retaining means on the bush, the retaining means being rotatable in the bush so that the cage is also rotatable in the bush.

An advantage of the present invention is that as the cage is free to rotate in the bush the balls are not constrained to follow fixed paths over the surfaces of the bush and the guide pin and there is thus no tendency for the balls to form grooves in these surfaces. In use it is found that there is usually some random rotation of the cage.

In a preferred arrangement the balls are disposed helically around the cage, and the longitudinally extending grooves in the cage are parallel with lines of balls inclined to the axis of the cage. As a result of this arrangement the retaining means move to-and-fro around the bush on each reciprocation of the guide pin in the cage and bush. The helical arrangement of the balls is advantageous for when the guide pin enters the cage it does not encounter a complete ring of balls simultaneously but encounters the balls successively. If the longitudinal grooves in the cage were not parallel with the lines of the balls the grooves would be likely to interfere seriously with the helical arrangement of the balls. This preferred arrangement would, of course, not be possible without the provision of retaining means capable of moving to-and-fro around the bush.

The invention will now be more particularly described with reference to the accompanying drawings, in which:

FIG. 1 is a somewhat diagrammatic section through one form of guide embodying the present invention.

FIG. 2 is a section through part of the bush of the guide shown in FIG. 1,

FIG. 3 is an elevation of the cage of the guide shown in FIG. 1,

Figure 4:
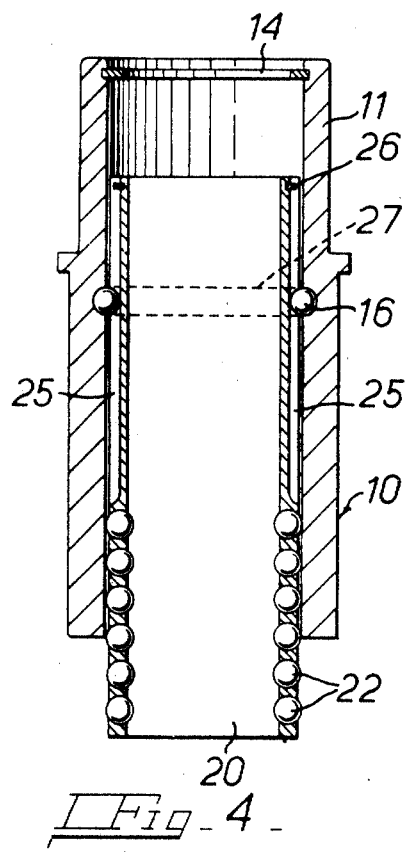
FIG. 4 is a somewhat diagrammatic section through another form of guide embodying the present invention.

The guide shown in FIG. 1 includes a bush 10 of generally cylindrical, tubular shape, the external diameter thereof being somewhat reduced at one end 11, and an outwardly directed integral flange 12 being provided between the reduced portion 11 and the main portion. In use the reduced portion 11 enters from below and is retained in a hole in the punch holder 13 of a die set, the flange 12 abutting the lower face of the punch holder. The bore of the bush 10 is cylindrical, and a removable and replaceable abutment is provided towards the upper end of the bore such as a snap ring 14 mounted in a suitable annular groove formed in the bore towards its upper end. Towards the bottom of the bore there is formed a further annular groove 15 (see FIG. 2). The groove 15 is of semicircular cross-section and constitutes a track for a pair of steel balls 16.

The guide also includes a guide pin 17 which is of conventional form and comprises a cylindrical pin of diameter somewhat less than the bore of the bush 10. In use the lower end of the pin 17 enters a hole in the base 18 of the die set in which it is frictionally retained and the upper end 19 of the pin is chamfered so as to assist the entry of the pin into the ball cage described below. The die set is not further illustrated or described herein as it does not form part of the present invention and may be of any suitable kind.

The guide also includes a tubular ball cage 20, which in use is housed in the bore of the bush 10. The length of the cage 20 is such that when its upper end abuts the snap ring 14 the other end thereof is substantially flush with the lower end of the bush 10. The bush is formed with a plurality of radial holes 21, each housing a hardened steel ball 22 which projects both inside and outside the bush. The mouths of the holes 21 are reduced in diameter so that the balls 22 cannot escape though they are free to rotate. As indicated in FIG. 3 the balls 22 are disposed in a spiral arrangement such that no two balls follow the same track along the bore of the bush 10 or the pin 17 when the cage 20 is moved lengthwise of the bush without rotation. To this end, the balls 22 are arranged in rows which are slightly inclined to the axial direction. Two grooves 23 are formed in the outer surface of the cage 20 and are disposed diametrically opposite to each other. The grooves 23 are parallel to the spiral arrangement of the balls 22 and extend from the lower end of the cage 20 for substantially half the length of the cage. Two of the rows of balls are shorter in length than the others, and the grooves 23 are aligned with the shorter rows of balls. The cross-section of the grooves 23 is approximately semi-circular to co-operate with the pair of steel balls 16 housed in the groove 15.

For simplicity of illustration the inclination of the rows of balls 22 and of the grooves 23 has not been indicated in FIG. 1, and it is for this reason that the figure has been described above as being somewhat diagrammatic.

To assemble the guide the cage 20 is introduced into the bore of the bush 10 and held so that the bottom of the cage is adjacent to the upper edge of the ball track 15 in the bush. The pair of balls 16 are introduced into the track so as to be opposite the grooves 23 in the cage, whereupon the cage can then be lowered to trap the balls 16 both in the track and also in the grooves in the cage. The snap ring 14 is then mounted in its associated groove in the top of the bush 10 so that the cage cannot project above the bush. The engagement of the balls 16 with the grooves 23 is such that the downward travel of the cage 20 is limited by the abutment of the balls with the upper ends of the grooves so that at most only about half the cage can project from the bush 10. As the balls 16 are mounted in an annular groove or track, however, the cage 20 is free to rotate within the bush.

In use, when the punch holder 13 is lowered towards the base 18 the ball cage 20 hangs down from the bush 10 and is retained by the engagement of the balls 16 with the upper end of the grooves 23. Due to the spiral arrangement of the balls 22 the pin 17 engages the balls one by one, so that they afford little resistence. When the upper end of the cylindrical surface of the guide pin 17 reaches the bore of the bush 10, the adjacent balls 22 are trapped between the pin and the bush and are caused to rotate and move the cage 20 relatively to the bush and pin. The balls 22 may be an exact fit but are preferably lightly compressed between the bearing surfaces. When the punch holder 13 is in its lowermost position the cage 20 is fully within the bush 10, and the upper end of the guide pin 17 is substantially level with the upper end of the bush.

The guide would normally be used in the manner described above, with the bush 10 projecting vertically downwards and the pin 17 projecting upwards. If the guide is used in another position a light spring (not shown) may be used to retain or assist in retaining the cage 20 in its projecting position until the pin 17 engages with it.

The guide shown in FIG. 4 is generally similar to that shown in FIG. 1, and similar parts in the two guides have been given the same reference numerals. The guide shown in FIG. 4 differs from that shown in FIG. 1 in that the grooves 23 are replaced by grooves 25 which extend downwards from the upper end of the cage 20 for substantially half the length of the cage but are otherwise similar to the grooves 23. A retaining ring 26 is mounted in an annular groove near the upper end of the outer surface of the cage 20 so as to close the upper ends of the downwardly extending grooves 25.

A ball track 27 similar to the groove 15 is formed in the bore of the bush substantially half way along the bore.

In assembling this alternative form of guide the cage 20 is first introduced in the bore of the bush 10 and held so that its upper end is adjacent to the lower edge of the ball track 27. In this position the balls 16 are introduced into the track opposite the grooves 25 in the cage 20, whereupon the cage can be moved upwards to trap the balls in the track as previously described. The cage 20 is then moved upwards until the groove for the retaining ring 26 is clear of the upper end of the bush 10, so that the retaining ring can be fitted. Further upward movement of the bush is prevented by the engagement between the pair of balls 16 and the lower ends of the grooves 25. The cage 20 can then be dropped down ot the position in which substantially half of it hangs below the lower end of the bush 10 and is suspended there by the engagement of the balls 16 with the retaining ring 26. The assembly is then completed by mounting the snap ring 14 in place. This prevents the cage 20 projecting upwards from the bore of the bush 10.

Figure 5:
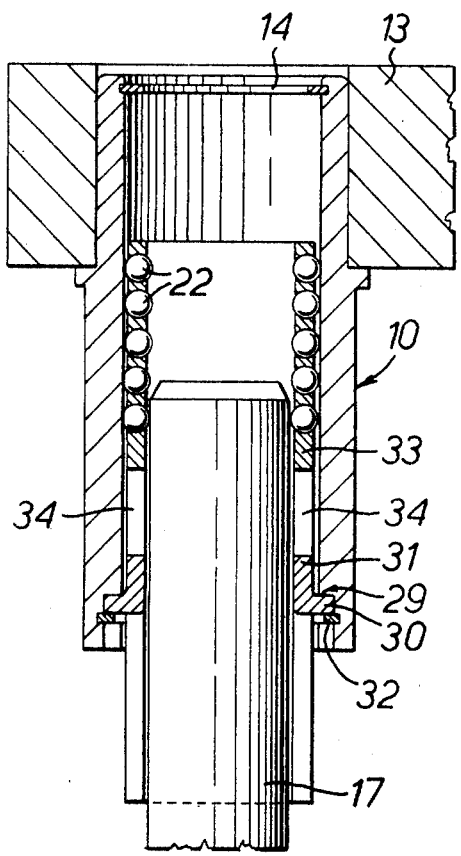
FIG. 5 is a somewhat diagrammatic section through yet another form of guide embodying the present invention, and, FIG. 6 is a perspective view of a component forming part of the guide shown in FIG. 5.
Figure 6:
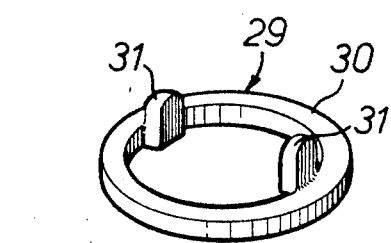

The guide shown in FIG. 5 is also generally similar to that shown in FIG. 1, and similar parts in the two guides have again been given the same reference numerals. In the guide shown in FIG. 5 a retaining washer 29 (shown in perspective in FIG. 6) is used in place of the steel balls 16. The washer 29 is in the form of a flat ring 30 with two integral lugs 31. The lugs 31 are diametrically opposed and initially project towards each other in the plane of the ring 30; they are then bent up at right angles to this plane.

In place of the groove 15 the bush 10 is provided at its lower end with a counterbore in which the retaining washer 29 is seated and is retained by a snap ring 32, mounted in a suitable groove immediately beneath the washer, the washer being free to rotate in the groove formed by the end face of the counterbore and the snap ring. The cage 33 is similar to that shown in FIG. 3, but the balls 22 are arranged in rows parallel with the axis of the cage, and grooves 34 differ from the grooves 23 in that they too are parallel with the axis of the cage and are of rectangular rather than of semicircular cross-section.

This guide is assembled by first mounting the retaining washer 29 in place in the counterbore and retaining it by means of the snap ring 32 and then introducing the cage 33 into the bore of the bush 10. The inside diameter of the ring 30 is such as to clear the cage and its projecting bearing balls 22; however, the lugs 31 project inwardly so as to engage the grooves 34 in the cage. The abutment between the lugs 31 and the ends of the grooves 34 limits the downward travel of the cage 33 so that at most only about half of the cage can project from the bush 10. As before the withdrawal of the cage from the bore of the bush is prevented by the snap ring 14.

I claim:
1. A guide for a die set of the kind having a punch holder and a base, the guide comprising a bush for the punch holder, a guide pin for the base; and a rectilinear bearing which bearing comprises a cage and a plurality of balls rotatable in the cage and in rolling engagement between the bush and the guide pin, the guide being characterized in that the cage has longitudinally extending grooves in its outer surface and in that the guide also includes inwardly projecting retaining means which enter said grooves and are rotatable in the bush, though are prevented from escaping from the bush, so that the cage is also rotatable in the bush when the guide pin is disengaged.

2. A guide according to claim 1 in which the retaining means comprises balls housed in an annular groove in the bore of the bush and projecting into the grooves in the cage.

3. A guide according to claim 1 including a ring mounted for rotation relatively to the bush and inwardly projecting lugs on the ring which lugs constitute said retaining means.

4. A guide according to claim 3 in which the ring is disposed in an annular recess in the bush which opens both inwards towards the cage and axially at or towards one end of the bush, and in which there is a removable and replaceable stop preventing withdrawal of the ring from the recess.

5. A guide according to claim 1 in which the balls in the cage are disposed helically around the cage, and the longitudinally extending grooves in the cage are parallel with lines of balls inclined to the axis of the cage.

6. A guide according to claim 1 in which the grooves are closed at least one end so that the cage cannot be withdrawn from the bush by movement relatively to the bush in at least one direction.

7. A guide according to claim 6 in which the grooves are permanently closed at one end and in which there is removable and replaceable stop means at the other end thereof.

References Cited

UNITED STATES PATENTS 2,371,330    3/1945    Irstad.
3,357,755    12/1967    Danly.

FOREIGN PATENTS 901,231    7/1962    Great Britain.

MARTIN P. SCHWADRON, Primary Examiner

L. L. JOHNSON, Assistant Examiner